May 11, 1965   L. W. HERCHENROEDER   3,183,421
DIGITAL POSITIONAL SERVO APPARATUS
Filed May 16, 1960   2 Sheets-Sheet 1

WITNESSES
Robert C. Baird
James F. Young

INVENTOR
Louis W. Herchenroeder.
BY
ATTORNEY

United States Patent Office 3,183,421
Patented May 11, 1965

3,183,421
DIGITAL POSITIONAL SERVO APPARATUS
Louis W. Herchenroeder, Penn Hills, Pa., assignor to Westinghouse Electric Corporation, East Pittsburgh, Pa., a corporation of Pennsylvania
Filed May 16, 1960, Ser. No. 29,192
5 Claims. (Cl. 318—28)

The present invention relates in general to positioning control apparatus for a machine member, and more particularly to numerical positioning control apparatus for a machine tool member.

It is an object of the present invention to provide improved numerical position controlling apparatus for a machine member, which apparatus is suitable for use with any number system.

It is a different object of the present invention to provide improved position controlling apparatus for a machine member, which apparatus is more suitable and faster operating relative to the time required for a given positioning operation.

It is an additional object of the present invention to provide improved numerical position controlling apparatus for a machine member, which apparatus is operative with a more advantageous number differencing apparatus arrangement to result in faster and more reliable positioning of the machine member from an actual position to a desired or reference position.

Further objects of the present invention will become apparent from the following description taken in conjunction with the accompanying drawings, wherein.

Figure 1:
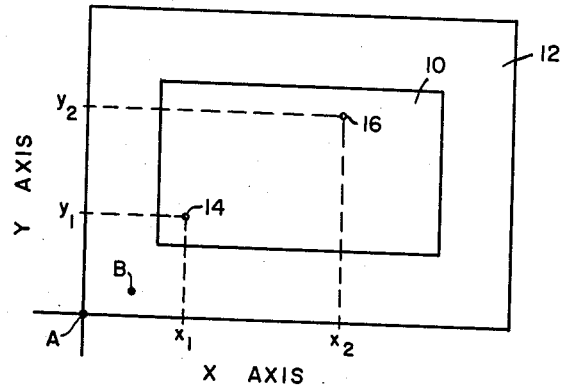
FIGURE 1 is a plan view of work piece apparatus showing a first or actual position of a machine member and a second or desired position for that machine member to be moved into.

In FIG. 1 there is shown a work piece 10 positioned on a work table 12 or the like of a machine tool member, such as a drill press for purposes of illustration. It is assumed that a first hole 14 has been drilled at a position on the work piece 10 corresponding to the $Y_1$ and $X_1$ coordinates as shown in FIG. 1 relative to a reference point A. It is now desired that a second hole 16 be drilled at a coordinate position defined by $Y_2$ and $X_2$ as shown in FIG. 1. For this purpose it is necessary that a first or Y axis control motor move the drill mechanism with respect to the work piece along the Y axis from the position $Y_1$ to the position $Y_2$. Further, it is desired that the second or X axis control motor move the drill mechanism with respect to the work piece along the X axis from the position $X_1$ to the position $X_2$. Thusly, the drill will be in position to complete the hole 16 at the coordinate location defined by $Y_2$ and $X_2$.

Figure 2:
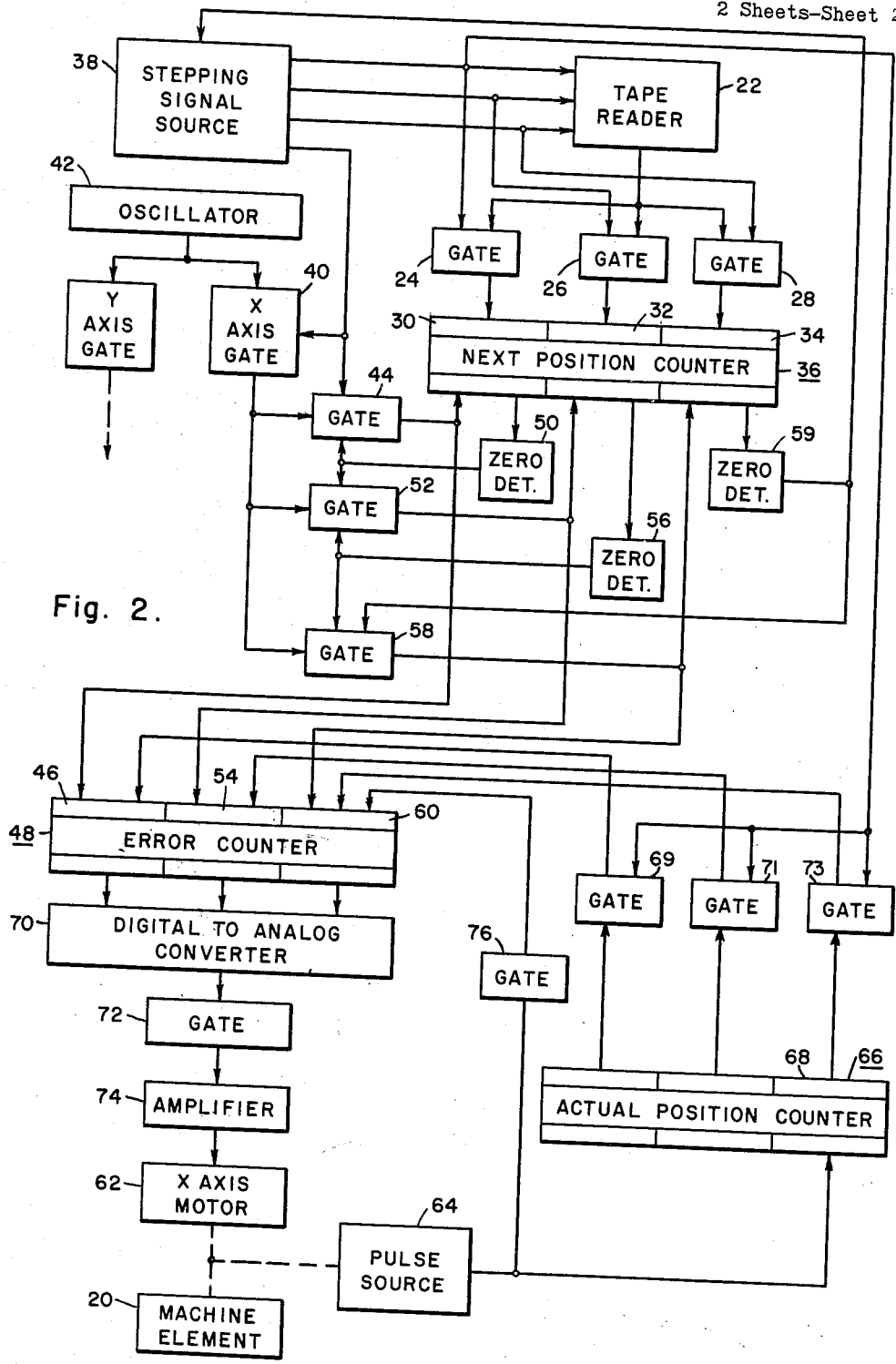
FIG. 2 is a schematic showing of the numerical positioning control apparatus in accordance with the teachings of the present invention.

In FIG. 2 there is provided a schematic showing of the numerical positioning control apparatus for the drill mechanism, which has been illustrated as the machine element 20. The desired position is supplied by a tape through a tape reader 22 in the form of a binary coded decimal signal which is supplied through the provided gate circuits 24, 26 and 28 to the respective stages 30, 32 and 34 of a next position counter 36, in a sequence and manner determined by the stepping signal source 38. The latter stepping signal source 38 may comprise a mechanical stepping switch, although a static and electrical operating type device would more probably be provided in this regard. In the operation of the tape reader 22 and the gate circuits connected between the tape reader 22 and the next position counter 36, the binary coded signal for the X axis motor for example, is first supplied decade by decade to the next position counter 36. More specifically, if it were desired to position the work piece to an $X_2$ coordinate of 43.8 the stepping signal source 38 would be operative to first connect through the gate 24 the most significant decade signal 4 in the binary coded decimal form of 0100. Next, the stepping signal source 38 would cause the digit 3 to be similarly supplied through the gate 26 to the stage 32 of the next position counter 36, and finally the stepping signal source 38 would open the gate 28 such that the digit 8 signal would be supplied in binary coded decimal form to stage 34 of the next position counter 36.

The stepping signal source 38 would then open the X axis gate 40. This would cause the output counting signals from the 10 kilocycle frequency oscillator 42 to be supplied through the gate 44 to the first stage 30 of the next position counter 36 and also to a first stage 46 of an error counter 48. When the signals from the oscillator 42 and cause the first stage 30 of the next position counter 36 to be counted down to a zero count, the zero signal detector 50 would sense the zero count in the first stage 30 of the next position counter 36 and provide a control signal to close the gate 44 and open the gate 52. This will now cause the counting signals from the oscillator 42 to pass through the gate 52 to the second stage 32 of the next position counter 36 and also to the second stage 54 of the error counter 48. The latter counting signals from the oscillator 42 are provided in a manner to count down the signal stored in the second stage 32 such that when the stored signal reaches a zero value, the zero signal detector 56 would provide an output signal which would close the gate 52 and open the gate 58. This allows the counting signals from the oscillator 42 to pas through the gate 58 and count down to zero the third stage 34 of the next position counter 36 as well as count into the third stage 60 of the error counter 48.

Prior to the supplying of the counting signals from the oscillator 42 to the respective stages of the error counter 48, the latter error counter 48 as will be later explained was supplied a control signal in accordance with the actual position of the machine element 20 in the following manner. The machine element 20 is positioned by a suitable device such as a motor 62 which for the illustration of FIG. 2 we will assume is the X axis motor. The X axis motor 62 is also mechanically connected to a suitable pulse source 64, which may be in the form of several well known pulse sources readily available on the open market at the present time and which provides an output signal in accordance with a predetermined increment of travel movement of the machine element 20, for example every 0.1 inch of travel. In other words, when the machine element 20 travels the distance of one tenth of an inch a single pulse is supplied by the pulse source 64. There also may be provided by the pulse source an indication of the direction of movement of the machine element 20. This is not shown in FIG. 2 in that as described the X axis motor 62 will move the machine element 20 only in a single direction and therefore the pulse source 64 need not provide an indication of whether or not the machine element 20 is moving in a direction relative to a reference point of greater distance or is moving in a direction to lessen the distance relative to the reference point, such as the reference point A shown in FIG. 1. The control pulses or signals from the pulse source 64 are supplied to an actual position counter 66 through the least significant stage 68 such that for each pulse supplied by the pulse source 64 the control signal stored in the actual position counter 66 will change by one unit. Further, the actual position counter 66 is connected to the error counter 48 through the provided gates 69, 71 and 73 as shown in FIG. 2 such that the control signal stored in each stage of the actual position counter 66 may be transferred into the corresponding stages of the error counter 48.

Thusly, it will be readily apparent that the error counter 48 receives a control signal in accordance with the actual position of the machine element 20 through the actual position counter 66, and further receives a control signal corresponding to the desired position signal supplied to the next position counter 36 through the operation of the oscillator 42 counting down the signal stored in the next position counter 36 one stage at a time and simultaneously changing the count stored in the error counter 48 in a corresponding manner. Thusly, any difference between the actual position of the machine member 20 and the desired position for this machine member will result in an error or difference signal from the error counter 48. The error counter 48, since it is a reversible type counter and since it receives the actual position signal as a count in a first direction and the desired position signal as a count in a second direction, will perform the necessary differencing operation. This error or difference signal from the error counter 48 is supplied to a digital to analog converter 70, which provides through a suitable gate circuit 72 and an amplifier 74 the necessary analog error signal to the X axis motor 62 for causing the machine element 20 to move the desired incremental distance along the X axis. As shown in FIG. 2 the control signals from the pulse source 64 are also supplied through a gate circuit 76 to the least significant stage 60 of the error counter 48 such that as the machine element 20 moves along the X axis, the control signals from the pulse source 64 change the count stored in both the actual position counter 66 and the error counter 48 in a manner to indicate the change in position of the machine element 20 and thereby to reduce the error or difference signal output of the error counter 48 accordingly to a zero value.

It should be noted relative to FIG. 2 that when the third stage 34 of the next position counter 36 reached a zero count due to operation of the counting signals supplied from the oscillator 42 passing through the gate 58, a zero signal detector 59 provided an output signal to close the gate 58 and to sequence the operation of the stepping signal source 38 to, for example, read from the tape reader 22 the desired coordinate position control signal for the position $Y_2$ along the Y axis.

Figure 3:
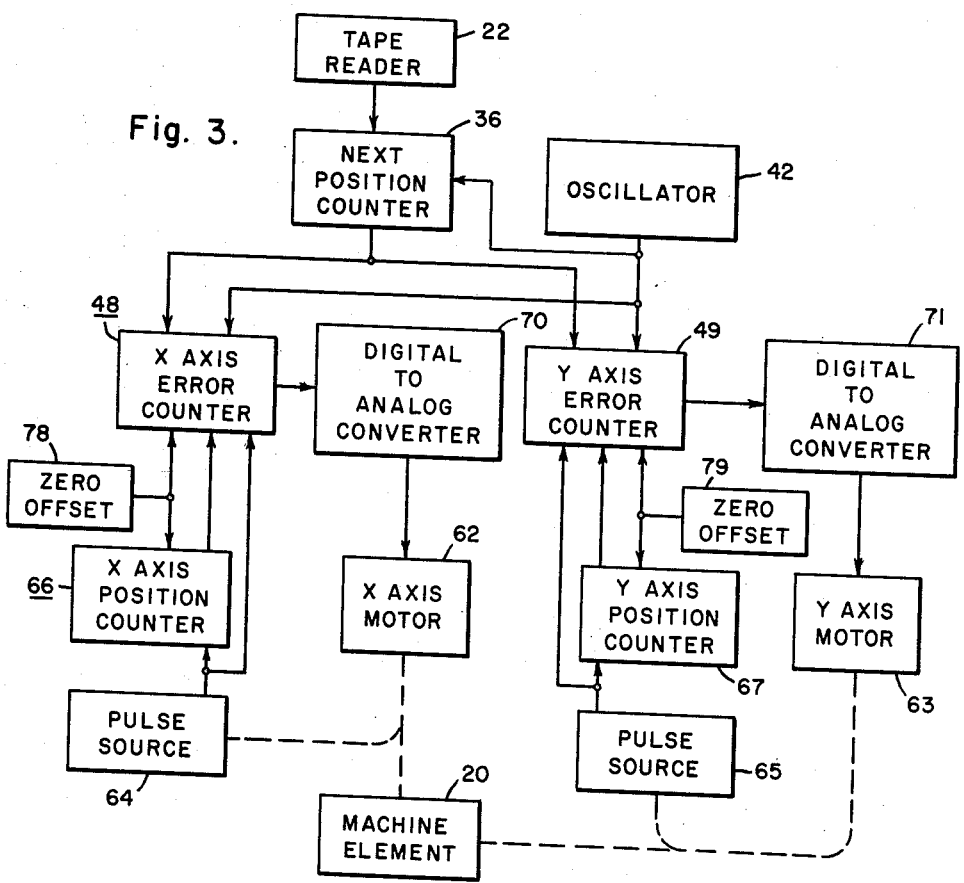
FIG. 3 is a diagrammatic showing of the positioning controlling apparatus of FIG. 2 and including control apparatus for controlling motion along both the X axis and the Y axis of the desired position.

In FIG. 3, there is provided a diagrammatic showing of the control apparatus shown in FIG. 2, wherein like numbers have been utilized to indicate similar control apparatus component elements. It will be noted relative to FIG. 3, that the Y axis error counter 49 is operative with the oscillator 42 in a manner similar to the operation of the X axis error counter 48. The gating circuits are not shown in FIG. 3.

The Y axis error counter in operative as a reversible type counter and receives a control signal from the Y axis position counter 67 in accordance with the actual position of the machine element 20 along the Y axis as in turn determined by the output control signals for this purpose from the pulse source 65. Also, the Y axis error counter 49 receives the next or desired position control signal from the tape reader 22 through the operation of the next position counter 36 for the next Y coordinate position along the Y axis or the $Y_2$ position for the illustration of FIG. 1. The difference or error signal provided by the Y axis error counter 49 is supplied to a digital to analog converter 71 and thereafter to a Y axis motor 63 in a manner similar to the operation of the X axis control apparatus as described relative to FIG. 2.

In FIG. 3 there is also shown a zero offset control signal source 78 operative with the X axis error counter 48 and the X axis position counter 66. Relative to the Y axis control apparatus there is shown a zero offset control signal source 79 operative with the Y axis error counter 49 and the Y axis position counter 67. The purpose of the zero offset signal sources 78 and 79 for their respective axes is to change the reference position from the position A to for example, the position B as shown in FIG. 1. The zero offset function per se is a well known control movement in the machine tool control art. The operation of the zero offset control signal source 78 for example, is to subtract from the position counter 66 and simultaneously add to the actual position stored in the X axis error counter 48 the difference in coordinate along the X axis between the reference position A and the reference position B. Similarly the zero offset 79 will subtract from the Y axis position counter 67 and add to the Y axis error counter 49 the difference in position between the reference point A and the reference point B along the Y axis. The polarity of the signals above is necessary in that the reference point B involves a decrease in control signal required to position the machine member relative to the reference point B along both the X axis and the Y axis as compared to the control signals required for positioning the machine tool relative to the reference point A along both the X axis and the Y axis. Similarly, a shift of zero in the opposite direction would require the opposite polarity offset control signals.

In the operation of the control apparatus as shown in FIG. 2, the oscillator 42 is operative to count down any control signal stored in the next position counter 36 in a stage by stage manner such that the control signal stored in the next position counter 36 is thereby effectively transferred to the error counter 48. If the frequency of the oscillator 42 is in the order of 10 kilocycles and an actually operative or practical next position counter 36 may require 5 decade stages, the maximum count required for each decade would be ten counting signals such that a maximum time period in the order of 5 milliseconds would be required to count down the largest practical X axis desired position control signal. It should be further noted that the provision of the zero signal detectors 50, 56 and 59 have several advantages over for example, a procedure such as the counting to coincidence of the individual decade stages of the next position counter 36. One reason for this is that it is easier to detect a zero count in each decade stage of the next position counter 36 rather than to effect coincidence with an arbitrary count in the individual respective stages of the actual position counter 66.

Further, in the operation of the control apparatus as shown in FIGS. 2 and 3 it should be understood that each actual position of the machine element 20 is stored as a control signal in the actual position counter 66 for the X axis position and the same is true for the Y axis position counter 67 relative to the Y axis position. This control signal is relative to a zero reference point such as the point A shown in FIG. 1. The actual position counter 66 for the X axis functions as an absolute position storage or recording device while the error counter 48 is operative as an incremental position storage or recording device.

Upon suitable command signal the tape is read to provide the next desired position control signal for the X axis for example. This causes the X coordinate desired position control signal to be read into the next position counter 36 one digit stage at a time. It should be noted relative to FIG. 2 that the command signal from the stepping signal source 38 which opens the gate 24 may also be operative to open the gates 69, 71 and 73 between the actual position counter 66 and the error counter 48 such that the actual position of the machine element 20 tween the actual position counter 66 and the error counter 48. When the gate 24 is closed the gates between the actual position counter 66 and the error counter 48 are also closed. The operation of the oscillator 42 through the X axis gate 40 to count down the individual digits stored in the respective stages of the next position counter 36 and thereby count into the respective stages of the error counter 48 relative to the actual position signal transferred from the actual position counter 66 is operative to provide an error signal or difference signal output from the error counter 48 to the digital to analog converter 70. As the X axis motor 62 responds to the control signal corresponding to the difference or error control signal supplied to the digital to analog converter 70 and the machine element 20 is corrected in its position, the pulse source 64 provides output signals to change the actual position control signal stored in the actual position counter 66 and also supplies control signals through the gate 76 to count down the difference or error control signal of the error counter 48. This process continues until the latter error signal is zero and the machine element 20 is in the desired X axis position.

Then the process is repeated for the Y axis desired position control signal with the Y axis gate being opened in the manner similar to the opening of the X axis gate such that the counting signals from the oscillator 42 are operative to transfer the Y axis desired position control signal into the Y axis error counter 49 in a manner similar to that previously described relative to the X axis.

If desired, the difference or error control signal of the error counter 48 may be made operative through the gate 72 to cause the X axis motor 62 to be operative during the same time period that the Y axis desired position control signal is being stored in the next position counter 36 and being transferred to the Y axis error counter 49. As an alternative operation, it may be desired to operate both the X axis motor and the Y axis motor simultaneously in which case the gate 72 for the X axis motor 62 may be opened simultaneously relative to the opening of corresponding gates for the Y axis motor 63 as shown in FIG. 3.

When the control pulses from the pulse source 64 have counted out the total error or difference signal of the error counter 48 this will stop the movement of the X axis motor 62, and the same is true relative to the control pulses from the pulse source 65 counting out the difference or error signal of the error counter 49. The polarity of the control pulses from the pulse sources as the control pulses are supplied to the actual position counter and the error counters is such that the actual position counter registers the total net movement from the reference point zero. If it is desired to control the movement of the machine member 20 in both directions along the X axis as well as along the Y axis, polarity switches sensing the movement direction could be effective to suitably polarize the output control pulses. As zero is approached the digital to analog converters recognize the decreasing error signals and transmit new signals to the amplifier which controls the slow down of the X axis motor 62 as may be desired.

The present application is related to a copending patent application entitled Digital Control Apparatus, filed May 20, 1960, Serial Number 30,617, and assigned to the same assignee.

Although the present invention has been described with a certain degree of particularity, it should be understood that the present disclosure has been made only by way of example and that numerous changes in the details of construction and the combination and arrangement of parts may be resorted to without departing from the scope and spirit of the present invention.

I claim as my invention:

1. In position control apparatus for a machine member operative with a desired position signal source, the combination of a first signal counter device having a plurality of stages and being operative with said signal source for receiving a plurality of digits of said desired position signal, a second signal counter device operative with said machine member for retaining an actual position signal in accordance with the actual position of said machine member, a third signal counter device having a plurality of stages and being operative with each of said first signal counter device and said second signal counter device for retaining a position difference signal in accordance with a predetermined difference between said desired position signal and said actual position signal, and a counting signal source operative with each of said first signal counter device and said third signal counter device for supplying counting signals to said first and third signal counters for providing said position difference signal.

2. In position control apparatus for a machine member operative with a desired position signal source, the combination of a first signal storage device operative with said signal source for storing a plural digit desired position signal, a second signal storage device operative with said machine member for storing an actual position signal in accordance with the actual position of said machine member, a third signal storage device operative with each of said first signal storage device and said second signal storage device for storing a plural digit position difference signal in accordance with a predetermined difference between said desired position signal and said actual position signal, and a difference determining signal source operative with each of said first signal storage device and said third signal storage device for supplying difference determining signals to said first and third signal storage devices for determining said position difference signal.

3. In position control apparatus for a machine member operative with a first position signal source, the combination of a first signal counter device having a plurality of stages and being operative with said signal source for receiving a plural digit first position signal, a second signal counter device operative with said machine member for receiving a second position signal in accordance with the actual position of said machine member, a third signal counter device having a plurality of stages and being operative with each of said first signal counter device and said second signal counter device for providing a third position signal in accordance with a predetermined difference between said first position signal and said second position signal, and counting signal means operative with each of said first signal counter device and said third signal counter device for supplying counting signals to the respective stages of said first and third signal counters for providing said third position signal.

4. In position control apparatus for a machine member operative with a reference position signal source, the combination of a first signal counter device having a plurality of counting stages and being operative with said signal source for receiving said reference position signal, actual position signal means operative with said machine member for providing an actual position signal in accordance with the actual position of said machine member, a second signal counter device having a plurality of counting stages and being operative with each of said first signal counter device and said actual position signal means for providing a position difference signal in accordance with a predetermined difference between said reference position signal and said actual position signal, and an operating signal source operative with each stage of said first signal counter device and each stage of said second signal counter device for supplying operating signals to said first and second signal counter devices for providing said position difference signal.

5. In position control apparatus for a machine member operative with a desired position signal source, the combination of a first signal counter device having a plurality of stages and being operative with said signal source for retaining said desired position signal, a second signal counter device operative with said machine member for retaining an actual position signal in accordance with the actual position of said machine member, a third signal counter device having a plurality of stages and being operative with each of said first signal counter device and said second signal counter device for retaining a position difference signal in accordance with a predetermined difference between said desired position signal and said actual position signal, and a counting signal source operative with at least each stage of said first signal counter device and with said third signal counter device for supplying counting signals to said first and third signal counter devices and being responsive to a zero signal condition of one of said counters for providing said position difference signal when the signal retained by said one of said first and third signal counter devices is substantially zero.

References Cited by the Examiner
UNITED STATES PATENTS

| | | | |
|---|---|---|---|
| 2,792,545 | 5/57 | Kamm | 318—162 X |
| 2,833,941 | 5/58 | Rosenberg et al. | 307—149 |
| 2,886,753 | 5/59 | Abbott | 318—28 |
| 3,002,115 | 9/61 | Johnson et al. | 307—149 |

JOHN F. COUCH, *Primary Examiner.*
ORIS L. RADER, *Examiner.*